US005117877A

United States Patent [19]
Sharp

[11] Patent Number: 5,117,877
[45] Date of Patent: Jun. 2, 1992

[54] OVERFILL ASSEMBLY MADE OF POLYMERIC MATERIAL

[76] Inventor: Bruce R. Sharp, 7685 Fields-Ertel Rd., Cincinnati, Ohio 45241

[21] Appl. No.: 616,650

[22] Filed: Nov. 21, 1990

[51] Int. Cl.[5] .......................... B65B 3/06; B65B 1/04; F16L 5/00; B67D 5/00

[52] U.S. Cl. ........................................ 141/86; 141/98; 141/311 A; 137/371; 404/26; 52/20; 222/108; 405/52

[58] Field of Search ....................... 141/86, 311 A, 98; 220/85 F, 85 SP, 85 R; 52/19, 20, 21; 404/25, 24, 26; 405/52; 222/108; 177/368-372, 312, 367, 364

[56] References Cited

U.S. PATENT DOCUMENTS 4,278,115 7/1981 Briles et al. .......................... 141/86
4,501,305 2/1985 Zola et al. ............................ 141/86
4,527,708 7/1985 Dundas et al. .................. 141/86 X
4,593,714 6/1986 Madden .......................... 141/86 X
4,615,362 10/1986 Hartman et al. ...................... 141/86
4,655,361 4/1987 Clover et al. .................... 220/85 F
4,659,251 4/1987 Petter et al. ...................... 141/86 X
4,696,330 9/1987 Raudman et al. ...................... 141/86
4,706,718 11/1987 Milo ...................................... 141/86
4,763,806 8/1988 Podgers et al. .................. 141/86 X
4,770,317 9/1988 Podgers et al. .................. 220/86 R
4,793,387 12/1988 LeBlanc et al. ...................... 141/86
4,807,675 2/1989 Sharp .................................... 141/86
4,809,866 3/1989 Crocker ........................... 141/86 X
4,842,443 6/1989 Argandona ......................... 52/20 X
4,881,579 11/1989 Sharp .................................... 141/86
4,896,705 1/1990 Podgers et al. ....................... 141/86
4,960,346 10/1990 Tamayo ............................... 405/52

*Primary Examiner*—Ernest G. Cusick
*Attorney, Agent, or Firm*—Charles R. Wilson

[57] ABSTRACT

An overfill assembly for controlling overfill of liquid to an underground storage tank during a filling operation comprises a dump tank, a fill tube positioned within the dump tank, piping with a valve, a cover base anchor ring, and a cover. The cover base anchor ring and preferably the fill tube within the dump tank are encased with a shrink-fitting covering which extends from the neck and dump tank bottom wall, respectively to ensure liquid tight fits.

8 Claims, 4 Drawing Sheets

OVERFILL ASSEMBLY MADE OF POLYMERIC MATERIAL

This invention relates to an assembly for attachment to a storage tank for collecting overfilled liquid. More particularly, the invention relates to an overfill assembly useful with underground storage tanks.

BACKGROUND OF THE INVENTION

Storage tanks for holding bulk quantities of liquid are used throughout industry. Gasoline service stations make wide use of underground storage tanks which hold from about 10,000 to 40,000 gallons of gasoline. These tanks are filled periodically from transport trucks. Usually a fill connection is found at ground level for easy filling. A delivery hose is connected to the fill connector and gasoline pumped from the truck to the tank. Automatic shut-off valves ensure that dispensing of the gasoline is controlled. However, faulty delivery hoses, poor line connections or even operator error can result in gasoline being spilled at the fill connection. Any spill is generally small and is readily absorbed into the environment. However, continued spilling over a period of time or one large spill poses a substantial health hazard.

Various devices have been suggested for use in minimizing gasoline spills during a filling operation. U.S. Pat. Nos. 3,732,902, 4,204,564, 4,457,439 and 4,615,362 disclose overfill pits and tanks of various designs. None, however, have proven to be completely satisfactory. Any overfill tank must be capable of ready attachment to a storage tank and be reliable. In particular, stress points which can lead to cracking or potential sources of spill leakage must be eliminated. Additionally, access to the interior of the overfill tank for filling purposes must be readily accomplished. Because a transport tank is restricted as to where it can park for unloading, the fill tank's delivery hose may lead to the overfill tank from any direction. Access to the fill connections of any overfill tank must be able to accommodate such delivery hoses.

There has now been developed an overfill assembly which is economical to produce, yet which fills a long felt need. The assembly has a minimum of connections so as to reduce substantially any possibility for early failure. Additionally, the assembly is readily installed on a storage tank.

SUMMARY OF THE INVENTION

An assembly for use on underground storage tanks comprises a dump tank molded of one piece construction having a reservoir portion for receiving overfilled liquid and a neck extending from the reservoir portion. A fill tube within the dump tank extends through a bottom wall of the reservoir. The assembly also comprises piping with a directional flow control valve extending from the dump tank's interior to the fill tube, a cover base anchor ring positioned in the neck and a removable cover in the cover base anchor ring so as to gain access to the interior of the dump tank. The assembly has a unitary structure with a shrink-fit covering over a part of the cover base anchor ring and preferably over the fill tube extending from the point where the fill tube enters the dump tank bottom.

DETAILED DESCRIPTION OF THE INVENTION

Figure 1:
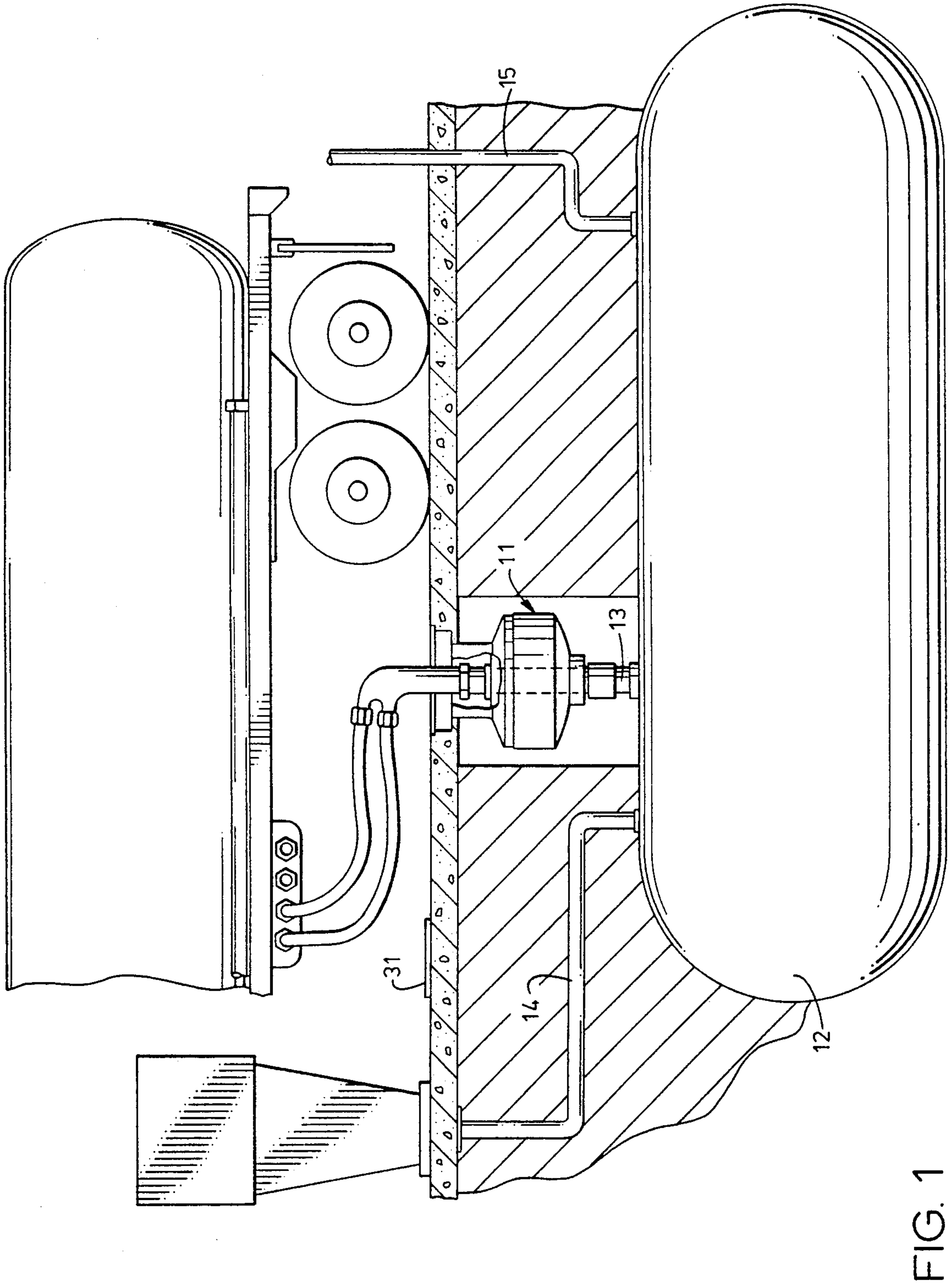
FIG. 1 is a view partially in section of an underground storage tank with the overfill assembly of this invention mounted thereon.

The overfill assembly of this invention is shown in FIG. 1 mounted on an underground storage tank. The assembly 11 is useful with any type of bulk storage tanks, though is particularly useful with an underground storage tank for gasoline as found most commonly in retail gasoline service stations. The storage tank 12 is made of steel. Tanks made of a fibrous reinforced resinous material are also commonly used. A fill line 13, dispensing line 14 and vent pipe 15 all extend into the storage tank's interior and fulfill known functions. The fill line 13 enters the tank at an opening in the top surface of the storage tank 12. Dispensing line 14 and vent pipe 15 also enter the storage tank through their own openings as depicted or through a manhead as found on certain storage tank designs. The overfill assembly 11 is mounted on top of the storage tank 12 so that a cover for gaining access to its interior is at ground surface level.

Figure 2:
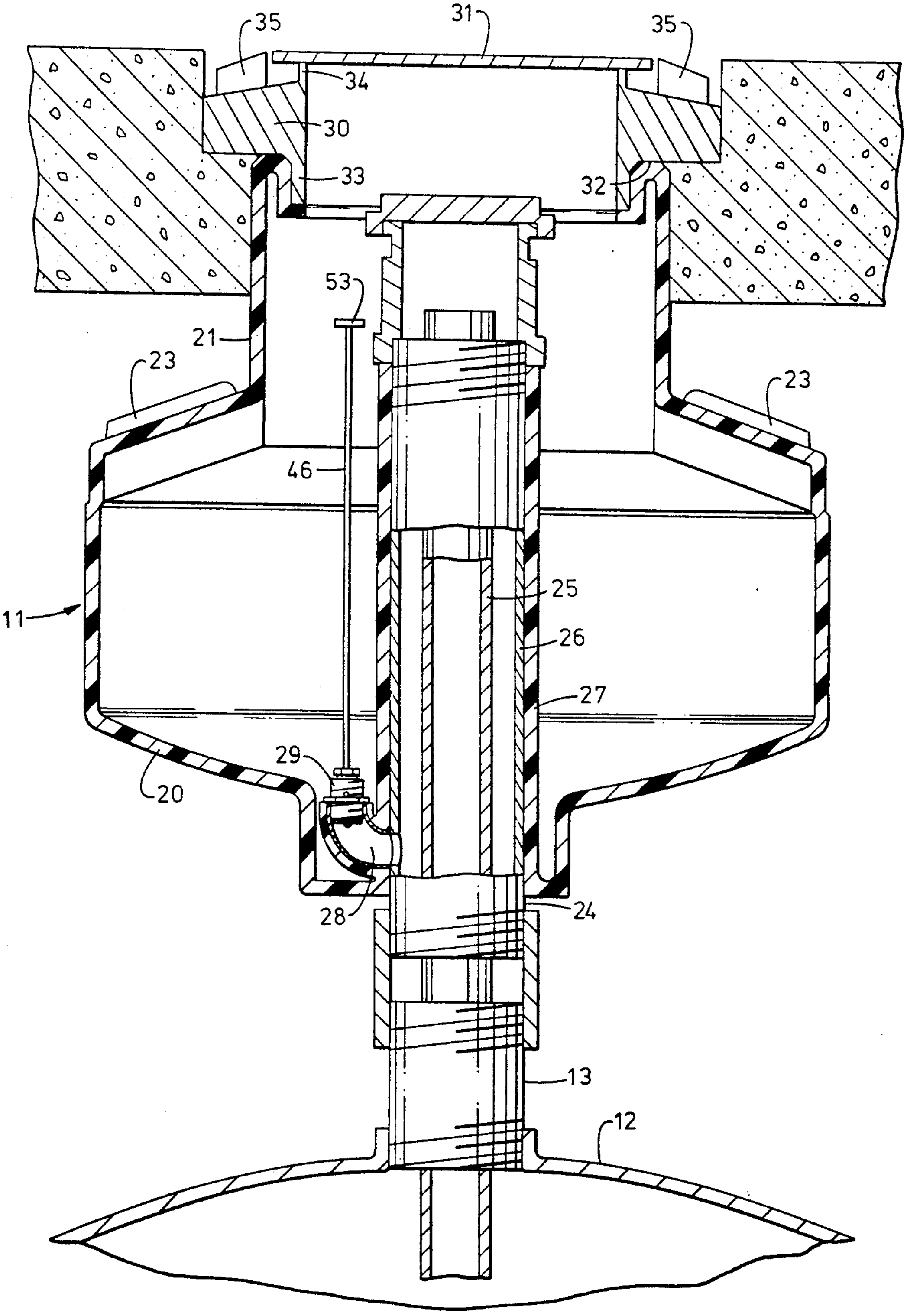
FIG. 2 is a side view in section of the overfill assembly depicted in FIG. 1.

As best shown in FIG. 2, the overfill assembly 11 comprises a dump tank having a bell shaped body with a reservoir portion 20 and an elongated neck 21. The tank is dimensioned to hold up to about thirty-five gallons of liquid. Generally, though, the shape and exact capacity of the overfill assembly is not particularly important. Ribs 23 are optionally provided on the exterior surface of the reservoir portion 20 as an aid in installing the assembly to a fitting found in the storage tank and for providing added strength. The elongated neck 21 extends from the reservoir portion 20 and has an opening at its top. Another opening in a bottom wall of the reservoir portion is provided for accommodating a fill tube 24.

The fill tube 24 extends from a point within the elongated neck 21 through the opening in the bottom wall of the reservoir portion 20 and a short distance beyond. The fill tube is comprised of an inner fill pipe 25 through which liquid flows and an outer vapor recovery pipe 26. The area between the two pipes is used for vapor recovery purposes. Coaxial fill tubes of this general nature are commonly used in the gasoline storage tank industry. Single wall pipes are usable when the particular industry permits their use.

A threaded lower extremity of the fill tube 24 is securely held in position by the bottom wall of the reservoir portion 20. A threaded female adaptor with a compression flange can be used in a known fashion. Preferably, and as evident in FIG. 2, extending from the 25 bottom wall of the reservoir is a shrink-fit covering 27 which encases the fill tube at least one inch along its length. Most preferably, the covering 27 extends to near the tube's upper extremity. In effect, the covering 27 is an extension of the reservoir walls. The fill tube is not removable from the dump tank. Because of this construction, there is no possibility of spilled liquid seeping out through the reservoir at the fill tube's exit.

Piping 28 extends from the dump tank's interior at or near its bottom to the fill tube 24 at a location either inside (as shown in FIG. 2) or outside of the reservoir. A directional flow control valve 29 is associated with the piping 28 to allow a controlled flow of liquid found in the reservoir 20 to the storage tank. Any valve which provides directional flow control can be used.

A cover base anchor ring 30 is also held permanently in liquid-tight position to the dump tank in a manner similar to the fill tube 24. The anchor ring 30 and a removable cover 31 are used to close off the neck opening. The cover base anchor ring has a central opening for gaining access to the dump tank's interior. Any anchor ring dimensioned so that a portion thereof extends into the elongated neck of the dump tank is suitable. Preferably, and as shown in FIG. 2, the cover base anchor ring also has an annular shoulder 32 and an annular flange 33 extending from the shoulder to fit into the neck of the dump tank. The shoulder 32 rests on the extremity or lip of the neck while the annular flange 33 is dimensioned to extend at least one-half inch therefrom. The cover base anchor ring is permanently positioned in the neck of the dump tank. An extension of the neck encases at least a part of the annular flange with a shrink-fit covering to ensure a liquid-tight fit.

Also extending from the body of the cover base anchor ring is a raised rim 34 on which the removable cover 31 rests. The purpose of the rim is to force rain water and such to run off the anchor ring and not into the interior of the dump tank. The rim in effect acts as a dam.

Figure 3:
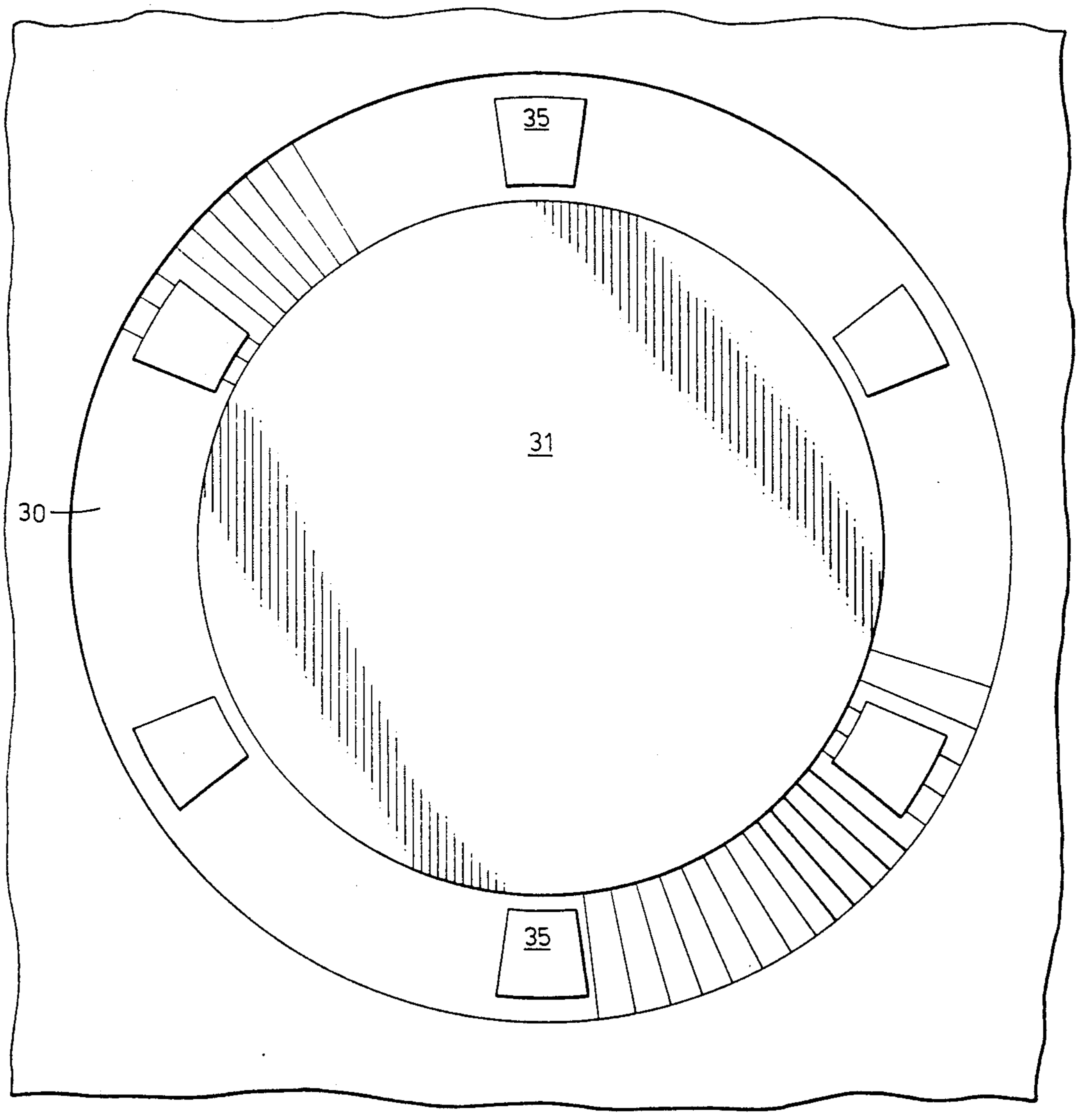
FIG. 3 is a top view of the overfill assembly of FIG. 2.

As best seen in FIG. 3, the cover base anchor ring 30 preferably has a series of ramps 35 on the top surface of the anchor ring. The ramps provides a means to even out the ground surface for motor vehicles driving over the anchor ring and cover. The ramps are preferably downwardly angled.

The removable cover 31 is circular-shaped to fit the opening in the cover base anchor ring. The cover sits on the rim of the anchor ring and is removable to permit ready access to the interior of the dump tank, particularly the fill tube for filling the storage tank.

Figure 4:
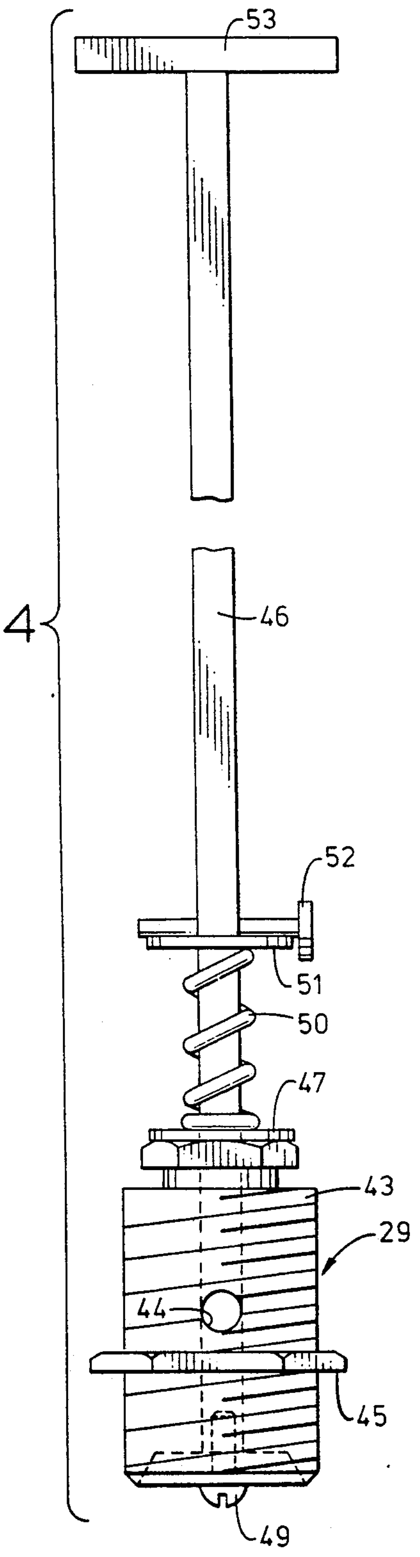
FIG. 4 is a side view of a valve used with the overfill assembly of FIG. 2.
Figure 5:
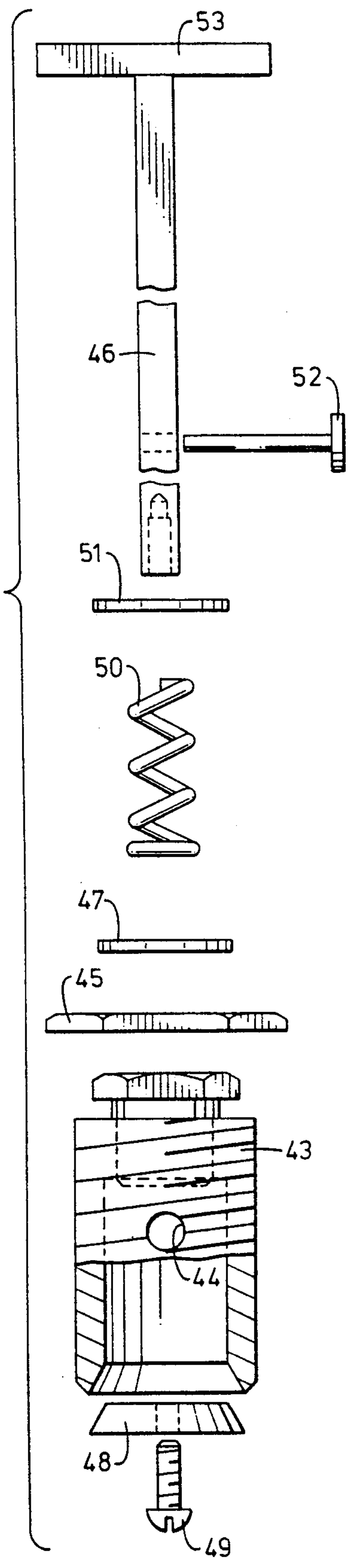
FIG. 5 is an exploded view of the valve of FIG. 4.

Shown in FIGS. 4 and 5 is a detail of the valve 29. The valve is a manual valve and is readily adapted for installation in the piping 28 extending from near the bottom of the reservoir portion 20. As shown, the directional flow control valve 29 is comprised of a hollow threaded fitting 43 with at least one drain hole 44 extending to the hollow center. A retaining nut 45 is used to lock the fitting into the bottom opening. A push rod 46 extends from near the top of the overfill's top interior surface through a shoulder 47 on the fitting and into the hollow center. A washer 48 dimensioned to form a sealed closing with a recess in the bottom of the fitting 43 is secured to the end of push rod 46 by a screw 49. A spring 50 with stop shoulder 51 and stop pin 52 are positioned on the rod to ensure that washer 48 forms a sealed closing when in a rest position. A handle 53 is provided to manually operate the opening of the valve. In operation, when a downward force is exerted on the push rod, the rod's extremity with washer 48 is forced downwardly thereby permitting any spilled liquid to flow through drain hole 44, into piping 28, and to the storage tank.

In a preferred embodiment of the invention, the upper portion of the fill tube found in the assembly of this invention is held in a steady position by an attachment means radiating from near the fill tube's upper extremity to the interior neck wall of the dump tank. Various attachment means can be used to hold the fill tube in approximate center point alignment with the neck wall. Most preferably, a plate with a center hole to accommodate the fill tube is attached to the neck wall. Drain holes are provided in the plate to allow any excess liquid from a filling operation to overflow into the reservoir portion. A screen is normally permanently attached to the holes to filter out unwanted debris. Other attachment means such as a bracket or a set of brackets which could form a spoke-configuration can as well radiate from the fill tube to the neck wall 2 for the purpose of steadying the fill tube in the dump tank. The attachment means proves useful in the invention herein during manufacture and installation.

The dump tank with the fill tube and cover base anchor ring permanently positioned and encased by the shrink-fit coverings is made by a roto-molding process using a synthetic polymer. Roto-molding processes for producing various items are well known. Initially, a removable mold with the metal fill tube and metal cover base anchor ring in place is charged with polymer powder. The mold is then rotated in all directions while applying heat. Centrifugal force from the rotation operation forces the powder to the walls of the mold, cover base anchor ring and preferably the fill tube where the heat melts it. When the process is stopped, an essentially unitary structure is produced. The polymer cools from a molten state and shrinks resulting in the shrink-fit coverings. In effect all sources of possible leaks are eliminated by encasing such with the synthetic polymer. Proper placement of mold material and processing conditions results in the production of the desired configuration. Recesses located near the interior bottom of the dump tank of FIG. 2 where the piping is positioned and the interior upper neck near the cover ring can be filled-in by proper process conditions. The assembly with its unitary structure is leak-proof, strong and ready for installation on an existing storage tank.

In operation, the overfill assembly is securely attached to the top surface of a storage tank. Conventional threaded piping and bushings are used for this purpose. The piping is dimensioned so that the removable cover of the assembly is at approximate ground surface level. Next, back-fill is added around the storage tank and overfill assembly and concrete poured around the cover base anchor ring to present a level surface for traffic. The fill tube in the assembly extends through the bottom wall of the reservoir portion and leads to the interior of the storage tank. Once installed, the storage tank is filled by a transport truck operator removing the cover and, if need be, any fill tube cap. A delivery hose is connected to the fill tube and normally gravity flow is used to transport a liquid through the hose, fill tube and into the storage tank. A truck valve is shut off when the tank is filled. Disconnection of the delivery hose will allow any liquid still within the hose to drain into the reservoir portion of the dump tank. Opening of the directional flow control valve in the bottom of the dump tank allows any overfilled liquid to drain through the piping into the storage tank's head space to the extent there is room. Any excess liquid will eventually drain into the storage tank as space permits.

The overfill assembly of this invention has been described with particular reference to the drawings. Various obvious modifications may be made without departing from the scope of coverage of the appended claims. For example, other drain valves such as float check valves with automatic draining can be used. Covers of all types can be used for the sealing the dump tank's interior. Still other obvious changes can be made.

What is claimed is:

1. An assembly for use with an underground liquid storage tank to control overfill of liquid during a filling operation, said assembly comprising:

(a) a dump tank molded of one piece construction from a polymeric material having a reservoir portion with a bottom wall and a neck extending from the reservoir portion wherein the bottom wall of the reservoir portion has an opening to accommodate a fill tube and the neck has an opening at its top whereby access is gained to the interior of the dump tank;

(b) a fill tube securely positioned in the dump tank with an upper extremity near the dump tank's neck and a lower extremity extending through the bottom wall opening;

(c) piping which extends from the dump tank's reservoir portion to the fill tube;

(d) a directional flow control valve associated with the piping through which overfilled liquid can flow in response to opening of the flow control valve;

(e) a cover base anchor ring securely positioned in the neck of the dump tank, said anchor ring having a central opening and having a portion which extends into the neck of the dump tank and further wherein an extension of the neck encases at least that portion of the anchor ring which extends into the neck with a shrink-fit covering to ensure a liquid-tight fit between said anchor ring and neck; and (f) a removable cover for fitting over the cover base anchor ring central opening so as to close off the dump tank.

2. The assembly of claim 1 further wherein an extension of the bottom wall of the reservoir portion of the dump tank extends at least one inch along the fill tube's length from the point where the fill tube's lower extremity enters said bottom wall so as to encase the at least one inch of fill tube with a shrink-fit covering to ensure that liquid which spills into the dump tank will not seep therethrough.

3. The assembly of claim 2 wherein the cover base anchor ring has a shoulder which rests on a lip of the neck and an annular flange extending from the shoulder into the neck, said annular flange being at least the portion of the anchor ring which is encased.

4. The assembly of claim 2 wherein the dump tank is made of a polymeric material by a roto-molding process.

5. The assembly of claim 2 wherein the piping extends into the fill tube at a point inside of the dump tank.

6. The assembly of claim 1 wherein the fill tube is threaded on its lower extremity for ready attachment to an underground storage tank fill opening.

7. The assembly of claim 1 wherein the directional flow control valve is a manual valve.

8. The assembly of claim 2 wherein the shrink-fit covering extends to near the fill tube's upper extremity.

* * * * *